Feb. 20, 1968 C. W. TURBYFILL 3,369,607
CEMENT BASKET
Filed March 28, 1966 2 Sheets-Sheet 1
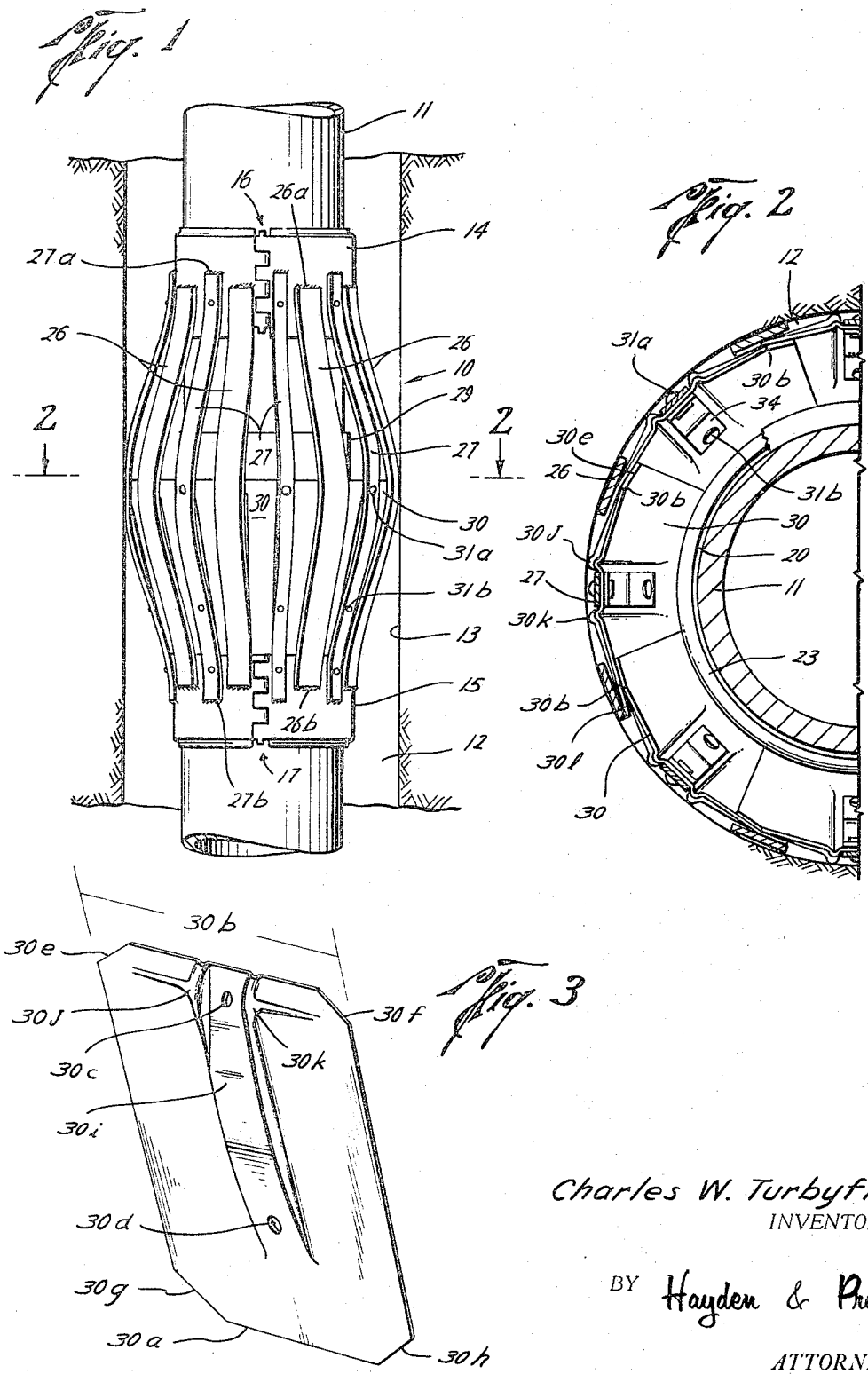
Charles W. Turbyfill
INVENTOR.
BY Hayden & Pravel
ATTORNEYS

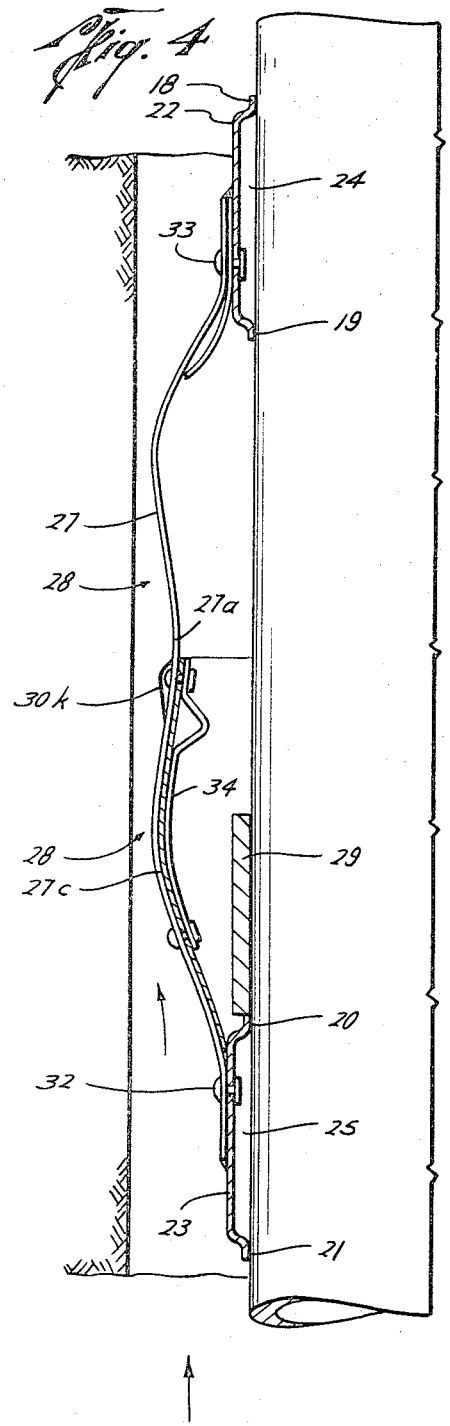
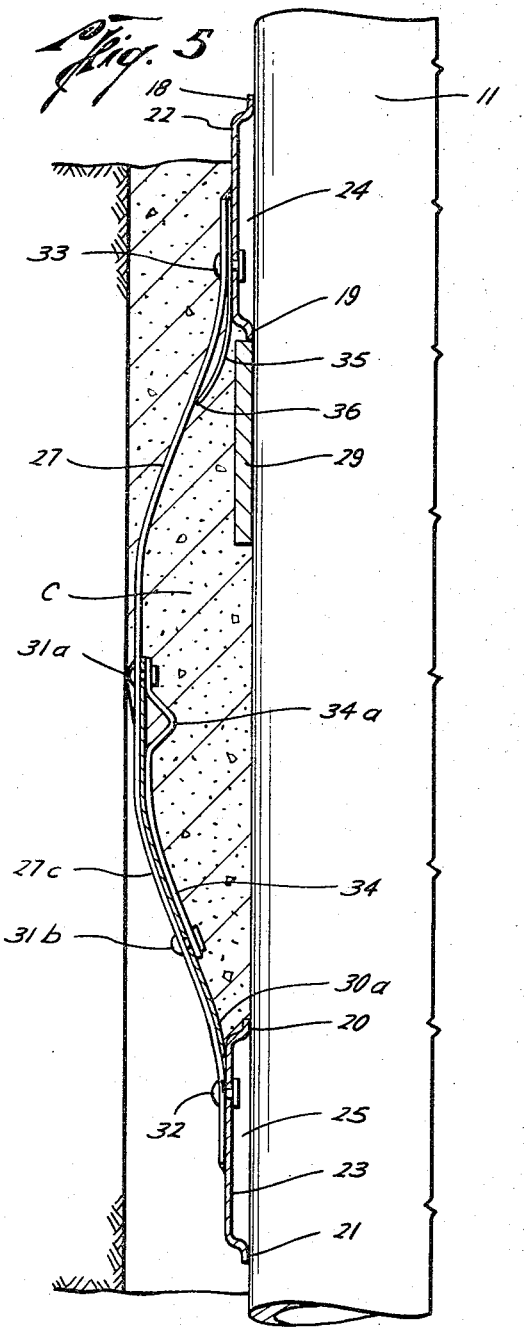

United States Patent Office 3,369,607
Patented Feb. 20, 1968

3,369,607
CEMENT BASKET
Charles W. Turbyfill, P.O. Box 490,
Marshall, Tex. 75670
Filed Mar. 28, 1966, Ser. No. 537,917
3 Claims. (Cl. 166—202)

ABSTRACT OF THE DISCLOSURE

A new and improved cement basket for use in a well bore.

Background of the invention

(1) Field of the invention

It is well known that cement baskets are positioned in a well bore around a tubular member to prevent cement and the like from displacing mud after down hole circulation has terminated. For example, in drilling operations if a sand formation that fractures easily is encountered, it may be desirable to position a cement basket above the sand formation. This enables mud and cement to be circulated around the well bore annulus and pressure will force the cement upwardly past the cement basket. However, after circulation is stopped, the hydrostatic pressure builds up and would force the cement out into the sand if the cement basket were not positioned around the tubular member to prevent the cement from dropping downwardly. Thus, the cement basket prevents the cement from dropping down adjacent the sand formation after circulation is terminated and prevents the cement from displacing the circulated mud.

(2) Description of the prior art

It should be readily apparent that when fluids are being circulated upwardly in the bore hole a certain amount of pumping pressure is necessary to force the fluid upwardly in the well bore and if a cement basket is positioned on a tubular member and directly in the path of flow of the fluids it becomes necessary to move the fluid through the cement basket which causes an increase in pumping pressure.

Another problem in prior cement baskets is the problem of positioning them on the exterior surface of a tubular member.

Prior cement baskets must be welded on a tubular member and of course, when it is desired to remove them, they must be cut off with a cutting torch or the like which is very inconvenient and troublesome.

Summary of the invention

It is an object of the present invention to provide a cement basket with alternately positioned rigid and flexible bows, petal or leaf members secured to each of the flexible members and resting and overlapping on the rigid bows wherein the flexible bows buckle with a slight increase in pumping pressure which causes the leaf or petal members to reduce their diameter and thereby enables fluids to pass therethrough.

It is another object of the present invention to provide a cement basket with alternately positioned rigid and flexible bows which retains the same contour and shape even when the cement basket becomes compressed or elongated due to unusual down hole conditions so that the uniform perimeter of the basket is retained.

It is yet another object of the present invention to provide a cement basket including spaced hinged collars to permit easy positioning and removing of the cement basket from a tubular member.

Brief description of the drawings

FIG. 1 is an elevation of the present invention positioned around a tubular member in a well bore;

FIG. 2 is a partial cross-sectional view taken along line 2—2 of FIG. 2 illustrating the relationship of the elements of the present invention;

FIG. 3 is a perspective view illustrating a petal or leaf member of the present invention;

FIG. 4 is a partial cross-sectional view illustrating the movement of the flexible bows and leaf members when pressure from fluids and the like open the cement basket of the present invention to permit fluids to pass therethrough; and FIG. 5 is a partial cross-sectional view illustrating the petal or leaf members of the cement basket of the present invention being used to support cement inserted in the well bore.

As illustrated in FIG. 1 the present invention is generally designated by the numeral 10 and is shown as being positioned exteriorly of and around a tubular member 11 which is positioned in a well bore or bore hole 12 having a bore hole wall 13.

The invention 10 includes a pair of spaced collars 14 and 15, respectively, which are provided with internally formed hinges 16 and 17 which prevents the hinges from being crushed, bumped, mauled or scraped on the bore wall 13 or other objects so that the collars 14 and 15 can usually be positioned on or removed from the tubular member 11. As illustrated in FIGS. 4 and 5, the internally hinged collars 14 and 15 are provided with lips or flanges 18, 19 and 20, 21 respectively which engage the tubular member 11 on the outer surface thereof and which are provided with circular support members 22 and 23 respectively, integrally formed with the lips 18, 19, 20, and 21 respectively. The support members 22 and 23 form a circular channel or enclosure 24 and 25 between the lips 18, 19, 20 and 21 respectively which enables each of the collars 14 and 15 to be internally hinged and also insures that there will be a positive spacing of the tubular member 11 from the well bore wall 13.

As illustrated in FIGS. 1, 4, and 5, the present invention 10 is provided with a plurality of alternately spaced or positioned rigid compressible bows 26 and flexible bows 27 which are secured at each end 26a, 26b, 27a, 27b to the exterior surface of the support members 22 and 23, respectively, in any suitable manner, such as welding or by a plurality of brads 32 and 33, respectively. The rigid compressible bows 26 are convexly curved or arcuate and contact or engage the well bore wall 13 to substantially center the tubular member 11 in the well bore 12. If, due to unusual down hole conditions, such as the well bore becoming smaller in diameter, the rigid bows are forced or pushed inwardly, the spaced collars 14 and 15 are adapted to move away from each other in a longitudinal direction relative to the tubular member so that the cement basket 10 becomes elongated and the tubular member remains substantially in the center of the well bore. The thin, flexible bows 27 are in the same arcuate shape and form as the rigid bows 26 but are adapted to yield to the application of pressure, such as from fluid. As illustrated in FIG. 4, when fluids are circulated upwardly through the cement basket 10 the flexible bows 27 are adapted to bend or yield inwardly substantially in the center 27a thereof toward the tubular member 11 due to a slight increase in pumping pressure from below so that there is formed a gap or opening 28 between the well bore wall 13 and the flexible bows 27 to permit fluids to circulate through the present invention 10 and the opening 28 while the rigid bows 26 remain in place to center the tubular member in the well bore. A stop collar 29 is tightly secured around the external surface of the tubular member 11 and as illustrated in FIGS. 4 and 5, when the spaced collars 14 and 15 move or slip longitudinally relative to the tubular member 11 when responding to pressure from below or pressure from above, the stop collar 29 prevents the collars from slipping the full length of the tubular member and enables the cement basket 10 to be positioned within a reasonable desired area on the member 11.

As illustrated in FIGS. 1 to 5, a plurality of leaves or petal members 30 are secured to the lower half 27c of the inner surface of the rigid compressible bows 27 by a plurality of brads or nuts and bolts 31a and 31b. The leaves or petals 30 extend downwardly and are wedged or positioned at the bottom 30a thereof between the support member 23 of spaced collar 15 and the flexible bows 27 immediately adjacent the plurality of brads or nuts and bolts 32.

The petals or leaves 30 are of a sufficient width 30b to overlap with each other so that the overlapped petals form a circular wall extending from approximately the bottom half 27c of the flexible bows 27 downwardly to the spaced collar 15. The leaves 30 rest and overlap with each other on the inner surface of the rigid arcuate compressible bows 26. As shown in FIGS. 3, 4, and 5, the leaves 30 are secured to the flexible bows 27 by passing or forcing the brads or nuts and bolts 31a and 31b through the openings 30c and 30d and are positioned between the flexible bows 27 and a plurality of inner bows 34. The petals or leaves 30 have tapered edges 30e, 30f, 30g and 30h at each corner thereof and the openings 30c and 30d are positioned in a slotted depression 30i which is parallel to the longitudinal length of the flexible bows 27 and is substantially the same width thereof. Immediately adjacent the slotted depression 30i are raised edges 30j and 30k which fit snugly against the sides of the flexible bows 27 adjacent the upper brads 31a.

As previously mentioned, when the leaves or petals 30 are attached to the flexible bows 27 they overlap with each other and rest on rigid compressible bows 26 to form a circular wall or enclosure extending from the upper limits of the bottom half 27c of the flexible bows 27 downwardly to the spaced collar 15. As illustrated in FIG. 4 when the bows 27 are pressed inwardly while responding to pressure from below the leaves or petals 30 also respond to this pressure and are pushed inwardly by the bows 27 and the pressure so that they buckle or move inwardly toward the tubular member 11. In this position the leaves are more overlapped than they normally are in FIG. 2. In other words, when pressure from below buckles the petals 30 and flexible bows 27, the circular wall or enclosure becomes smaller in diameter due to the increase in pressure.

As illustrated in FIGS. 2, 4, and 5 and as mentioned above the inner bows 34 are positioned and secured with the flexible bows 27 and the leaves 30. The inner bows 34 extend downwardly parallel to the flexible bows 27 from the brads 31a to the brads 31b and are provided with an arcuate portion 34a immediately adjacent brads 31a which curves outwardly toward tubular member 11. When the flexible bows 27 are responding to fluid pressure from below and the buckling action or squeezing action of the petals 30 occurs the inner bows 34 are also forced inwardly toward the tubular member 11. The arcuate portion 34a prevents the inner bow 34 from laying flat against the tubular member 11 to prevent a vacuum or suction from occurring between the inner bow 34 and the tubular member 11. After the inner bows 34, flexible bows 27 and leaves 30 have responded to pressure from below the inner bows 34 exert an outward force on the flexible bows 27 and the leaves or petals 30 to return them to their normal position which is immediately adjacent the bore hole wall 13.

To insure that this outwardly pressing or springing force produced by the inner bows 34 is sufficient to force the petals 30 outwardly, a plurality of spring members 35 are provided and are secured to the flexible bows 27 between the bows 27 and the support member 22 by the brads or nuts and bolts 33. The spring members 35 extend downwardly in an outwardly arcuate curve from the tubular member 11 to contact the flexible bows 27 at 36. When the flexible bow 27 and leaves 30 buckle inwardly responding to pressure the spring members 35 are also pushed inwardly and when this pressure from below has been reduced or has terminated, the spring member 35 presses with an outward force similar to the previously mentioned outward forces on the inner bows 34 to force the flexible bow 27 and the buckled leaves 30 outwardly to their normal positions.

While the operation of the invention is clear from the above discussion, the operation will be briefly explained.

The invention 10 is positioned on a tubular member 11 by securing the internally hinged spaced collars 14 and 15 around the tubular member. The tubular member 11 is then run in the well bore in a manner well known in the art and the flexible bows 27 and rigid bows 26 are similarly arcuately shaped so that normally the bows contact the well bore wall 13. If fluid is circulated and pumped upwardly in the well bore 12, the flexible bows 27 and leaves or petals 30 buckle inwardly so that the annulus 28 is formed between the well bore wall 13 and the flexible bows 27 to permit fluid to pass therearound. The rigid bows 26 remain stationary to center the tubular member in the well bore 12. When the pressure from below has decreased a sufficient amount or has terminated the inner bows 34 and the spring member 35 force the flexible bows 27 and the buckled leaves 30 outwardly to resume their normal position. While in the normal position, such as illustrated in FIG. 5, the cement basket 10 is used to hold cement so that the cement may be positioned in any desired place in the well bore 12 between the well bore wall 13 and the tubular member 11. The leaves 30, which form a circular wall around the collar 15 prevent the cement from escaping down into the well bore 12 and displacing fluids therebelow.

Briefly the present invention relates to a cement basket for positioning around tubular members including rigid compressible bows for centering the tubular members in the well bore and petals or leaf member secured to a plurality of flexible bows which are adapted to buckle in response to fluid from below so that the fluid may pass therethrough and a plurality of inner bows and spring members adapted to urge the flexible bows and leaves outwardly after the pressure from below has decreased a sufficient amount.

What is claimed is:

1. In a cement basket for securing externally around a tubular member and for use thereof in a well bore comprising:

(a) a pair of internally hinged spaced collars mounted around the tubular member;

(b) a plurality of arcuate rigidly compressible bows secured at each end thereof to said collars, said rigid bows being positioned between said collars wherein said bows normally contact the sides of the well bore to position the tubular member substantially in the center of the well bore so that pumped fluids may circulate evenly around the tubular member;

(c) a plurality of arcuate flexible bows positioned alternately relative to said rigid bows and secured at each end thereof to said collars, said flexible bows being positioned between said collars and conforming to the same arcuate shape as said rigid compressible bows;

(d) a plurality of leaf members, one of each of said leaf members being secured to one of each of said flexible bows and positioned between said bows and the external surface of the tubular member; and (e) a plurality of inner bows, one of each said inner bows being secured to one of each of said flexible bows and said inner bows being positioned between said leaf members and the external surface of the tubular member.

2. The structure as set forth in claim 1 wherein the sides of said leaf members secured to one of each of said flexible bows rest on said rigidly compressible bows and thereby overlap with each other to form the basket for receiving the cement, and wherein the bottom of said leaf members are supported by the lower of said spaced collars.

3. The structure as set forth in claim 2 including a plurality of spring members secured to the upper of said spaced collars between said flexible bows and said upper collar to urge said flexible bows to conform to the arcuate shape of said rigid compressible bows.

References Cited

UNITED STATES PATENTS

| | | | |
|---|---|---|---|
| 2,290,429 | 7/1942 | Hartman et al. | 166—172 |
| 2,392,145 | 1/1946 | Hall | 166—202 |
| 2,652,118 | 9/1953 | Hartman et al. | 166—202 |
| 3,114,422 | 12/1963 | Solum et al. | 166—202 |
| 3,119,451 | 1/1964 | Hall | 166—202 |
| 3,196,952 | 7/1964 | Solum | 166—241 |
| 3,292,705 | 12/1966 | Hall | 166—173 |

CHARLES E. O'CONNELL, *Primary Examiner.*

DAVID H. BROWN, *Examiner.*